United States Patent
Bremer

(10) Patent No.: US 10,238,150 B2
(45) Date of Patent: Mar. 26, 2019

(54) VIBROTACTILE MUSIC PERCEPTION WEARABLE

(71) Applicant: Katja Bremer, Berlin (DE)

(72) Inventor: Katja Bremer, Berlin (DE)

( * ) Notice: Subject to any disclaimer, the term of this patent is extended or adjusted under 35 U.S.C. 154(b) by 0 days.

(21) Appl. No.: 15/611,653

(22) Filed: Jun. 1, 2017

(65) Prior Publication Data
US 2017/0353778 A1    Dec. 7, 2017

Related U.S. Application Data

(60) Provisional application No. 62/344,336, filed on Jun. 1, 2016.

(51) Int. Cl.
| | | |
|---|---|---|
| *H04R 1/00* | (2006.01) | |
| *A41B 1/08* | (2006.01) | |
| *H04R 1/26* | (2006.01) | |
| *G09B 21/00* | (2006.01) | |
| *A41D 1/00* | (2018.01) | |
| *G08B 7/06* | (2006.01) | |
| *H04R 17/00* | (2006.01) | |
| *G08B 6/00* | (2006.01) | |
| *H04R 3/12* | (2006.01) | |

(52) U.S. Cl.
CPC ................ *A41B 1/08* (2013.01); *A41D 1/002* (2013.01); *G09B 21/009* (2013.01); *H04R 1/26* (2013.01); *G08B 6/00* (2013.01); *G08B 7/06* (2013.01); *H04R 3/12* (2013.01); *H04R 17/005* (2013.01); *H04R 2201/023* (2013.01); *H04R 2400/03* (2013.01); *H04R 2420/07* (2013.01); *H04R 2460/13* (2013.01)

(58) Field of Classification Search
CPC .............. H04R 17/005; H04R 2400/03; H04R 2201/023; H04R 1/26; H04R 2420/07; H04R 2460/13; G08B 6/00; G08B 7/06; A41B 1/08; A41D 1/002
USPC .................................................. 381/87, 151
See application file for complete search history.

(56) References Cited

U.S. PATENT DOCUMENTS

| | | | |
|---|---|---|---|
| 6,775,385 B1 * | 8/2004 | Coombs .................... | H04R 3/04 381/98 |
| 2009/0180646 A1 * | 7/2009 | Vulfson .................... | H04R 1/02 381/151 |
| 2011/0077728 A1 * | 3/2011 | Li .......................... | A61H 39/002 607/152 |
| 2012/0119920 A1 * | 5/2012 | Sallop .................... | A43B 3/0005 340/686.6 |
| 2016/0249698 A1 * | 9/2016 | Berzowska ............ | A41D 1/002 2/69 |
| 2016/0284436 A1 * | 9/2016 | Fukuhara ............. | D03D 1/0088 |
| 2017/0056644 A1 * | 3/2017 | Chahine ................ | A61N 1/0452 |
| 2017/0164116 A1 * | 6/2017 | Alexiou ................ | H04R 17/005 |
| 2017/0172227 A1 * | 6/2017 | Fan ..................... | A41D 31/0038 |

* cited by examiner

Primary Examiner — Paul Kim
Assistant Examiner — Ubachukwu A Odunukwe
(74) Attorney, Agent, or Firm — Goodhue, Coleman & Owens, P.C.

(57) ABSTRACT

A wearable includes an article of clothing, an intelligent control and a plurality of sets of vibration motors operatively connected to the intelligent control and positioned on the article of clothing to provide tactile feedback wherein each of the sets of vibration motors is associated with a different frequency range of audio which may be communicated to the wearable via Bluetooth or otherwise.

14 Claims, 3 Drawing Sheets

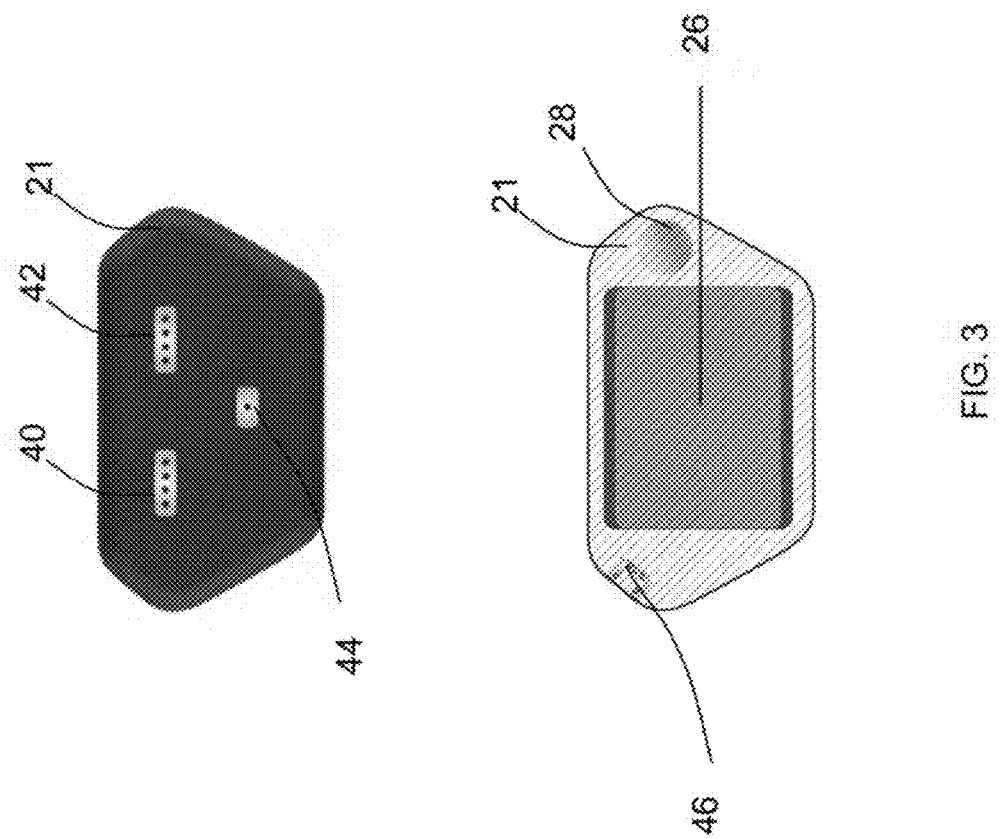

US 10,238,150 B2

VIBROTACTILE MUSIC PERCEPTION WEARABLE

RELATED APPLICATIONS

This application claims priority to U.S. Provisional Patent Application No. 62/344,336, filed Jun. 1, 2016, hereby incorporated by reference in its entirety.

FIELD OF THE INVENTION

The present invention relates to wearable devices. More particularly, but not exclusively, the present invention relates to clothing which allows vibrotactile music perception.

BACKGROUND

Music is a universal language, yet not everyone can experience music in the conventional way due to hearing loss. Moreover, even those without hearing loss may benefit from experiencing music or other audio in a tactile way. Therefore, what is needed are apparatus, systems, and methods for providing a tactile music experience.

SUMMARY

Therefore, it is a primary object, feature, or advantage of the present invention to improve over the state of the art.

It is a further object, feature, or advantage of the present invention to provide a tactile music (or other sound) experience.

It is a still further object, feature, or advantage of the present invention to accurately reproduce music (or other sound) vibrations.

Another object, feature, or advantage is to provide a wearable that does not make a user feel as if they are wearing electronics.

Yet another object, feature, or advantage is to provide a wearable that is safe.

A further object, feature, or advantage is to provide a wearable that is reliable.

A still further object, feature, or advantage is to provide a wearable that is durable.

Another object, feature, or advantage is to provide a wearable that is flexible and comfortable.

Yet another object, feature, or advantage is to provide a wearable that is easy and convenient to use.

A still further object, feature, or advantage is to provide a wearable which allows components to be removed if necessary so that the article of clothing is washable.

Another object, feature, or advantage is to provide a wearable that is conductive to fabrication such as with seamless warp knitting or flat knitting with seamlessly integrated elastic conductive yarns.

Yet another object, feature, or advantage is to provide a wearable device formed from electronic textiles or e-textiles.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

BRIEF DESCRIPTION OF THE DRAWINGS

Illustrated embodiments of the disclosure are described in detail below with reference to the attached drawing figures, which are incorporated by reference herein.

FIG. 3 illustrates additional views of a removable power module.

BRIEF DESCRIPTION OF THE APPENDIX

Attached as an appendix is a presentation that forms a part of this disclosure.

DETAILED DESCRIPTION

The present invention may include a wearable device in the form of a garment which includes functionality through creation of vibration to allow a wearer of the garment to experience music or other audio in a tactile manner and to provide an interface for interacting with the garment. The garment is formed in part from electronic textiles or e-textiles such as through seamless warp knitting or flat knitting with seamlessly integrated elastic conductive yarns.

Figure 1:
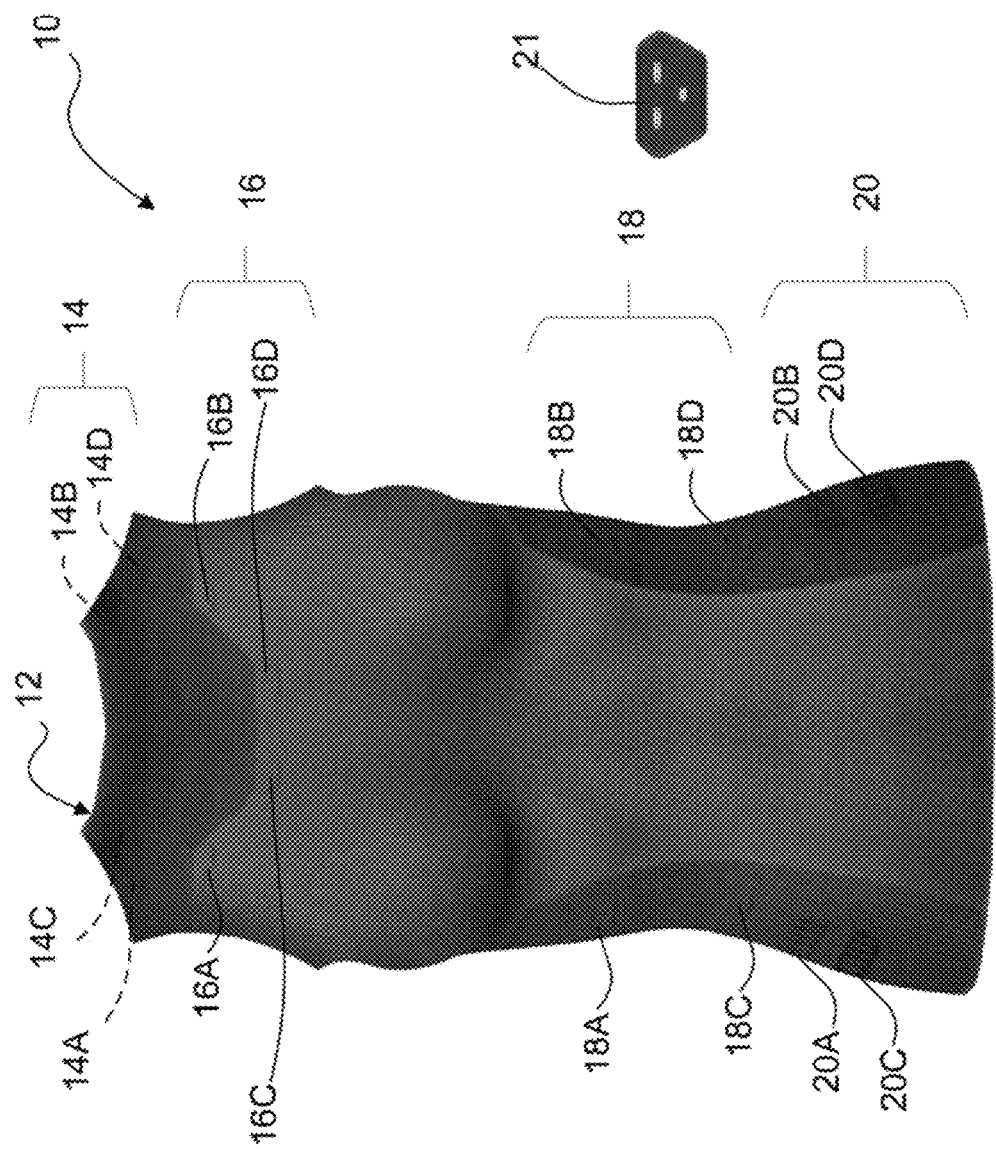
FIG. 1 illustrates one example of a garment.

FIG. 1 illustrates one embodiment of a wearable 10. The wearable 10 includes an article of clothing 12. Preferably, the article of clothing is body conscious. There are a plurality of sets of vibration motors 14, 16, 18 positioned on the article of clothing at various locations. Each of the sets of vibration motors 14, 16, 18 may have a different frequency range of audio associated with it. For example one set of vibration motors 14 may be positioned near the head and may be positioned on the back of the article of clothing 12. This set 14 includes vibration motors 14A, 14B, 14C, 14D which may be used for a highest range of frequencies. Another set 16 includes vibration motors 16A, 16B, 16C, 16D and may be positioned on the upper torso of the individual and may be used for a middle range of frequencies. Another set 18 includes vibration motors 18A, 18B, 18C, 18D and may be positioned on the lower torso of the individual and may be used for a lower range of frequencies. Thus, moving upwards on the body, the frequencies increase from low, medium, to high frequencies. Although, generally individuals appear to prefer the upper body vibrations, making shirts and other upper body garments preferable, vibration motors could be integrated into other types of garments including those for the lower body or in clothing which covers both the upper body and the lower body. In addition, vibration feedback may also be extended to the arms in the form of a t-shirt or a long sleeve shirt.

Each set of vibration motors 14, 16, 18 may have varying numbers of vibration motors. However, generally it has been found that multiple motors within the set, such as four motors within the set is preferable in order to be sufficient to convey the desired sensations. In addition, combining multiple motors over a larger surface allows the feel area to wide. The motors may be placed close to the skin so as to be felt with a second skin fit. The vibration motors may be positioned in a specially shaped holder such as with two conductive openings that connect to the positive and negative conductors (conductive yarn) integrated in the textile.

A garment interface 20 which may include user inputs in the form of textile sensors with separate touch areas 20A, 20B, 20C, 20 D. For example on one side of the garment, there may be a top touch area 20A and a bottom touch area 20C. Pressing the top touch area 20A and the bottom touch area 20C simultaneously may allow for turning on or off power. On the other side of the garment, there may be a top touch area 20B and a bottom touch area 20D. Pushing and holding the top touch area 20B may provide for increasing the intensity of all vibration motors. Pushing and holding the bottom touch area 20D may provide for decreasing the intensity of all vibration motors.

A power module 21 is shown. The power module 21 may include a battery or other power source. A back side of the power module 21 as shown may include magnetic connections to the garment to easily and precisely install the power module 21. This may include connections to positive conductors and a connection to a negative or ground conductor. The power module 21 may house a microcontroller or other intelligent control circuitry. An interface such as a micro USB connection also be present to allow storage devices containing audio files to be connected and to allow for charging or discharging of the battery. The power module 21 may also include a vibration motor which includes a metronome function which may be used for any number of purposes including independently from the garment. A display may also be present which preferably has low energy consumption. Examples of types of displays that may be used include lightpaper, OLED or LED.

Figure 2:
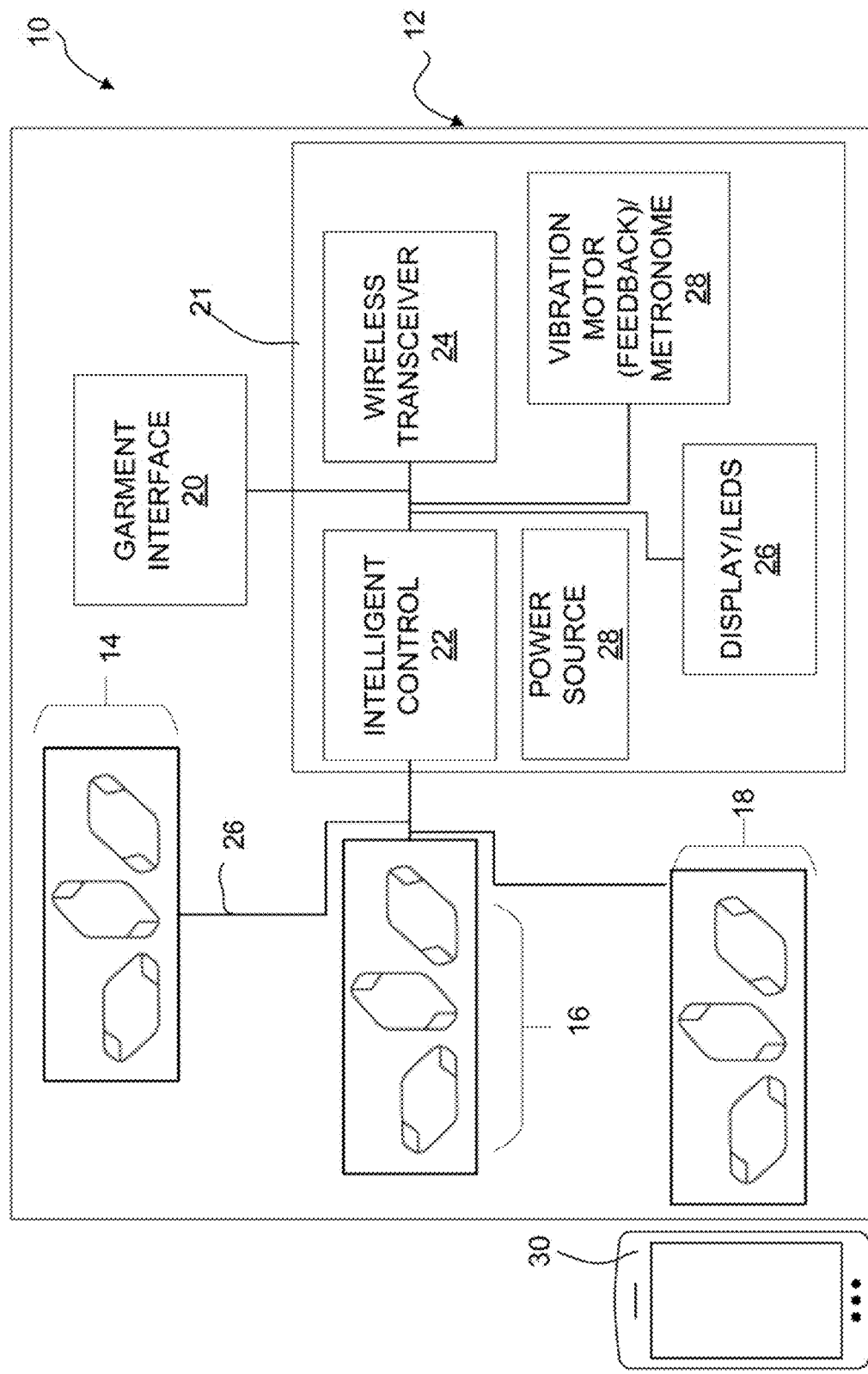
FIG. 2 is block diagram illustrating a computing device and a garment.

FIG. 2 is a block diagram illustrating one embodiment of a wearable 10 which includes an article of clothing 12. Various vibration motors 14, 16, 18 are placed at different positions. For example, vibration motors 14 may be placed near the head, vibration motors 16 may be placed near the middle torso, and vibration motors 18 may be placed on the lower torso of the individual. Each vibration motor may be encapsulated in order to be water proof thereby allowing the article of clothing 12 to be washed. The motors may be integrated in production through embroidery. Although three vibration motors are shown for each set, more of fewer may be present. A power module 21 is shown which may be removed. The intelligent control 22 which may be a microcontroller, processor, or other type of intelligent control is electrically connected to the various sets of vibration motors 14, 16, 18. These electrical connections may be made using electrically conductive yarn 26. The electrically conductive yarn 26 may be knitted directly into the textile of the garment such as through a seamless knit technology such as seamless warp knitting or flat knitting.

The intelligent control 22 is electrically connected to a wireless transceiver 24. The wireless transceiver 24 may be integrated into the same packaging as the intelligent control 22. The intelligent control 22, wireless transceiver 24, and power source 28 (such as a battery) may be integrated into a single removable module 21 which can be removed before washing the garment or may be used in different garments. The wireless transceiver 24 may communicate using Bluetooth, Bluetooth Low Energy (BLE), Wi-Fi, or other appropriate communication standard. The wireless transceiver 24 may be used for communicating with a computing device 30 such as a mobile phone, tablet, or other device. Music or other audio may be received as through the wireless transceiver 24. A garment interface 20 comprising one or more textile sensors may be electrically connected to the intelligent control 22 via conductive yarn. The garment interface may include separate user controls in the form of textile sensors for performing functions such as for turning power on or off or increasing or decreasing intensity of vibrations. Feedback may be provided to the user by activating one or more of the vibration motors in response to receiving user input.

A display or one or more LEDs 26 may be present. Where present the display or the one or more LEDs 26 are electrically connected to the intelligent control. The display or LEDs may be used to communicate information to the user. For example, the power levels of the power source 28 may be communicated. Alternatively, such information may be conveyed with an additional vibration motor 28 which may also be used to provide a metronome function. The removable power module 21 may include one additional vibration motor 28 which also functions as a metronome which may be used for rhythm training or other purposes. The removable module 21, including the metronome may function independently of the garment if desired and may be used with different garments. The power source 28 is electrically connected to the intelligent control 22, wireless transceiver 24, the vibration motors within the sets 14, 16, 18, and other components. The power source may be a rechargeable battery. One example of a type of battery which may be used is a lithium-polymer battery. Alternatively, the power source may be implemented using one or more energy harvesters such as those which harvest energy from movement by a user, rubbing, or body heat.

FIG. 3 illustrates two views of the power module 21. In FIG. 3, there are magnetic connectors 40, 42 for connecting with conductive yarn to provide a positive charge and magnetic connector 44 for connecting with conductive yarn to provide a negative charge or ground/neutral. On the other side of the power module 21 (the front), a display 26 may be present. A micro USB interface 46 is also present which may be used for charging the battery within the power module 21 and communication with the intelligent control disposed within the power module. Other types of connectors may be used if desired. A vibration motor 28 is also shown which may be used as previously described to provide vibratory feedback, to use a metronome to assist in timing or pacing, or for other purposes. In operation, the garment or other article of clothing may be controlled either through the garment interface 20 or through a computing device 30 in operative communicating with the garment. A software application such as a mobile app may be placed on the computing device 30 and may be executed using a processor of the computing device 30. The mobile app may include settings and features allowing a user to control and customize the garment. This may include changing presets such as assigning frequencies to different motors or taking certain motors online or offline. The mobile app may provide for control of more than one garment so, for example, where a group of friends or teammates are exercising together they can share the same experience. The mobile app may be used to set vibration intensity by boosting or cutting frequencies. The mobile app may also be used to display battery level and provide product support such as information about repair and services, contacting customer support representatives, and other features. In some embodiments, the mobile app may be used for converting audio files, such as audio files stored in an MP3 format or other audio file format to a format for the garment. In such an instance, audio files may be managed including the ability to download songs in the particular format, selecting songs, and creating playlists. In other embodiments, this file conversion process would not be needed as an audio stream may be processed in real-time either by the computing device or at the intelligent control of the garment. The user may decide whether they wish to feel only, or listen and feel at the same time.

The audio signal may be analyzed using any number of types of processing algorithms including Fourier-based analysis to extract energy values of specific frequency bands. After this frequency analysis, vibration mapping may be used for the extracted values to map them to specific vibration motors on the garment. The software may adjust the vibration frequencies to the motor requirements and optimal human body vibration frequency reception. Thus, in this manner music or other audio can be re-imagined as a vibro-tactile experiences. Such processing may occur in either a connected device such as a computing device or by the intelligent control of the garment or through a combination of both. The separation of frequencies and dynamic vibration waves allow the mood of a song to be felt as well as creating a surround sound feeling.

The invention is not to be limited to the particular embodiments described herein. In particular, the invention contemplates numerous variations in the number of vibration motors, the placement of the vibration motors, the type of garment, the type of materials used, and other variations. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A wearable, comprising:
   an article of clothing;
   an intelligent control;
   a plurality of sets of vibration motors operatively connected to the intelligent control and positioned on the article of clothing to provide tactile feedback; and
   a plurality of sensors for receiving user input electrically connected to the intelligent control;
   wherein each of the sets of vibration motors is associated with a different frequency range of audio;
   wherein a first set of the plurality of sets of vibration motors is placed higher on the article of clothing and a second set of the plurality of sets of vibration motors is placed lowered on the article of clothing;
   wherein each of the sets of the vibration motors is encapsulated within a holder having openings for conductive yarn conductors integrated into textile of the article of clothing.

2. The wearable of claim 1 further comprising a wireless transceiver operatively connected to the intelligent control.

3. The wearable of claim 1 wherein a set of vibration motors associated with a highest frequency range is placed higher on the article of clothing and a set of vibrations motors associated with a lowest frequency range is placed lower on the article of clothing.

4. The wearable of claim 1 wherein the plurality of sensors are electrically connected to the intelligent control using electrically conductive yarn seamlessly integrated in a knitted textile.

5. The wearable of claim 1 further comprising an electrical energy source electrically connected to the intelligent control and the plurality of sets of vibration motors.

6. The wearable of claim 5 wherein the electrical energy source is electrically connected to the intelligent control and the plurality of sets of vibration motors using electrically conductive yarn.

7. The wearable of claim 1 wherein the article of clothing is formed from a stretchable and breathable material for comfort created through knitting; wherein the knitting is selected from a set consisting of seamless warp knitting and flat knitting.

8. The wearable of claim 7 wherein the article of clothing forms a second skin fit to assist in positioning the vibration motors.

9. The wearable of claim 1 wherein the conductive yarn conductors comprise a plurality of positive conductors and a negative conductor.

10. The wearable of claim 1 wherein the article of clothing is a t-shirt, long sleeve shirt, or tank top.

11. The wearable of claim 1 wherein the intelligent control is configured to process an audio stream in real-time, analyze the audio stream based on frequency, and map frequencies to vibration motors within the plurality of sets of vibration motors.

12. A system comprising the wearable of claim 1 and a software application stored on a computing device comprising instructions stored on a computer readable storage medium which when executed by a processor of the computing device provide for configuring operation of one or more of the sets of vibration motors.

13. The system of claim 12 wherein the software application further provides for processing an audio-stream in real-time, analyzing the audio stream based on frequency, mapping frequencies to the vibration motors within the plurality of sets of vibration motors, and communicating instructions for operating the vibration motors to the wearable.

14. A wearable, comprising:
   an article of clothing;
   an intelligent control;
   a wireless transceiver operatively connected to the intelligent control;
   a plurality of sets of vibration motors operatively connected to the intelligent control and positioned on the article of clothing to provide tactical feedback;
   wherein each set of vibration motors further comprises at least three vibration motors;
   wherein each of the sets of vibration motors is associated with a different frequency range of audio;
   wherein a set of vibration motors associated with a highest frequency range is placed higher on the article of clothing and a set of vibrations motors associated with a lowest frequency range is placed lower on the article of clothing;
   wherein each of the vibration motors is encapsulated within a holder having openings for conductive yarn conductors integrated into textile of the article of clothing;
   wherein the article of clothing is formed from a stretchable and breathable material for comfort created through knitting; wherein the knitting is selected from a set consisting of seamless warp knitting and flat knitting;
   wherein the wireless transceiver is configured for communication with a computing device executing a software application stored on a computer readable storage medium, the software application having instructions which when executed by a processor of the computing device provide for configuring operation of one or more of the sets of vibration motors.

* * * * *